INVENTOR.
THURSTON W. HARWELL
BY John F. Hohmann
ATTORNEY

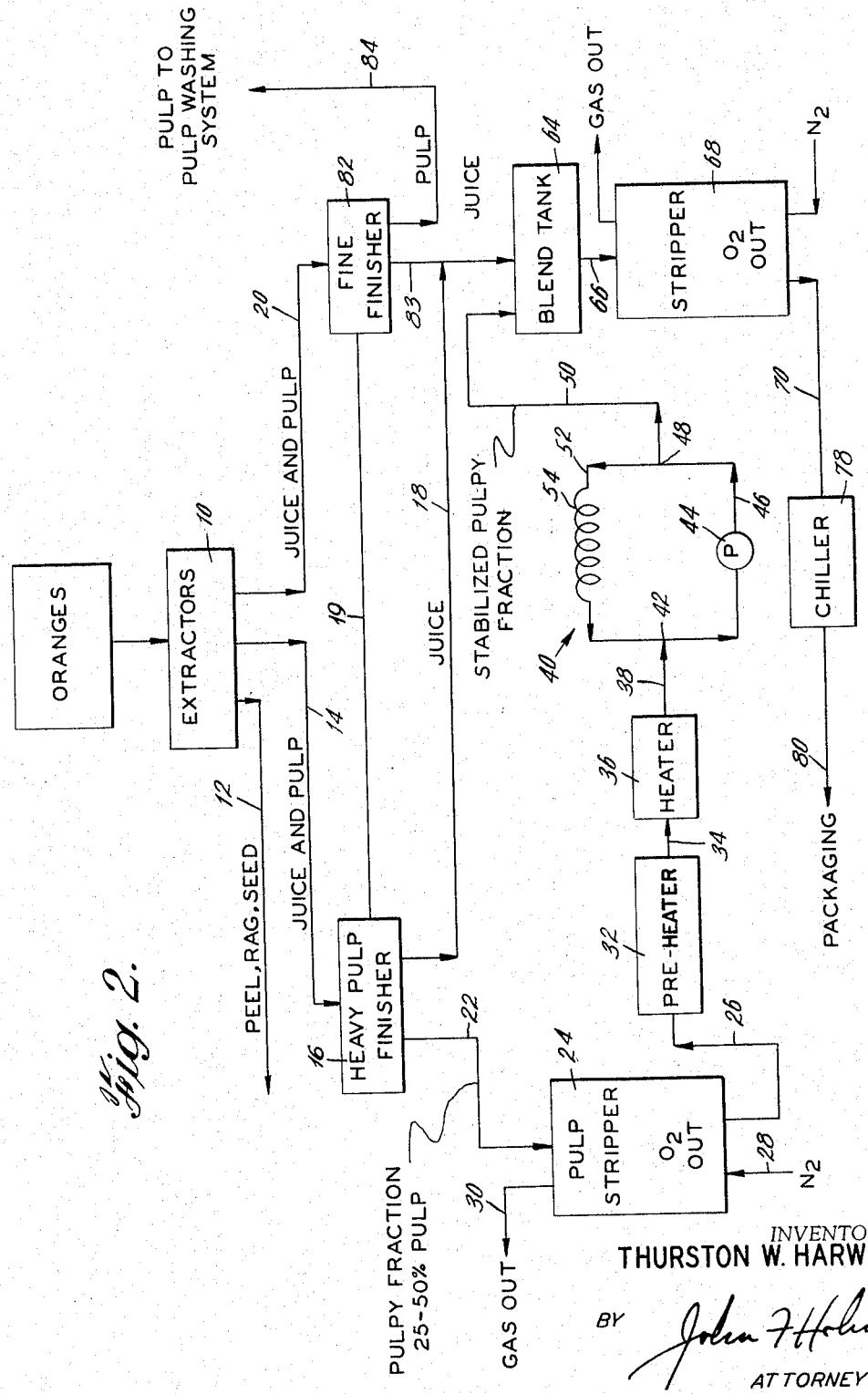

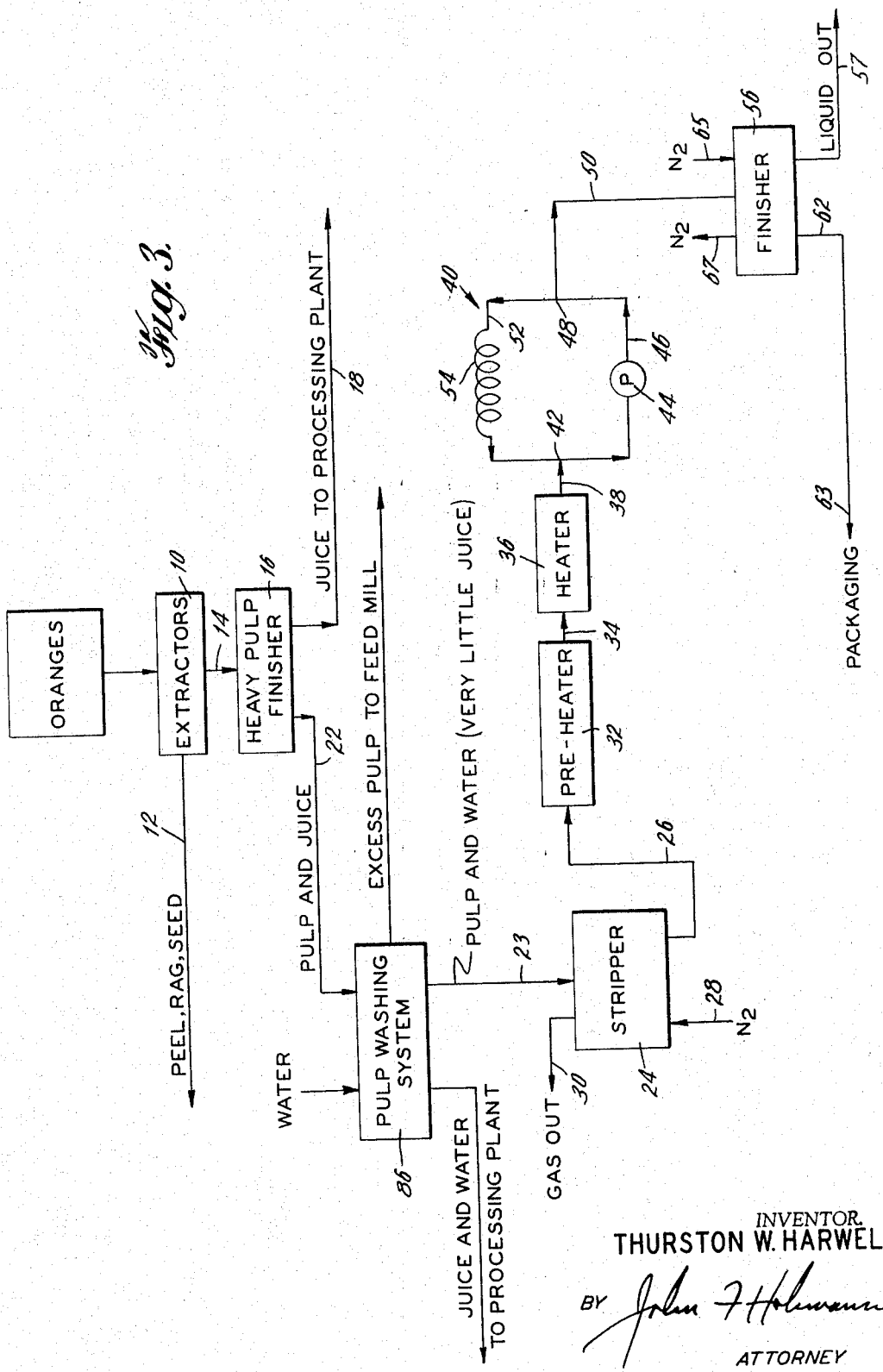

United States Patent Office 3,301,685
Patented Jan. 31, 1967

3,301,685
PROCESS FOR PRODUCING STABLE JUICE PULP AND STABLE JUICES CONTAINING SAID STABLE JUICE PULP
Thurston W. Harwell, Maitland, Fla., assignor to Union Carbide Corporation, a corporation of New York
Filed July 9, 1962, Ser. No. 208,237
16 Claims. (Cl. 99—105)

The present invention relates generally to a process for producing a stable juice pulp and a stable juice product, and, more particularly, to a process for reducing the adverse organoleptic effects of heat on juice pulps and pulp-containing products.

Heretofore, it has been proposed to separate fruit and vegetable juices, such as orange juice, into a pulp fraction and a liquid fraction, pasteurize the pulp fraction at a relative high temperature, concentrate the liquid fraction at a relatively low temperature, and recombine the pasteurized pulp and the concentrated liquid (see U.S. Patent No. 2,724,652 to J. A. Brent). Although such a process avoids subjecting the liquid fraction of the juice to the relatively high temperature of pasteurization, and even removes oxygen from the liquid fraction when the concentration thereof is by evaporation, it permits oxygen to remain in the pulp fraction. This oxygen is naturally carried over into the recombined product. Since fruit juices often deteriorate in color, flavor, or nutritive value on exposure to oxygen, the oxygen that is permitted to remain in the pulp fraction may have a deleterious effect on both the pulp and the recombined product. The rates of deterioration are especially rapid during stages of processsing or storage where high temperatures are encountered.

It is, therefore, the main object of the present invention to provide a process for producing a flavor-stable juice pulp and product which is substantially free of oxygen.

It is another object of the invention to provide a deoxygenated juice pulp which is both flavor-stable and physically stable over extended storage periods.

Further aims and advantages of the invention will be apparent from the following detailed description of preferred embodiments thereof taken in connection with the accompanying drawings, in which like numerals refer to like parts in the several views, and in which:

FIG. 2 is a schematic flow diagram of a modified embodiment of the invention for producing flavor-stable single-strength juice; and FIG. 3 is a schematic flow diagram of another modification of the invention for producing a flavor-stable juice pulp.

Figure 1:
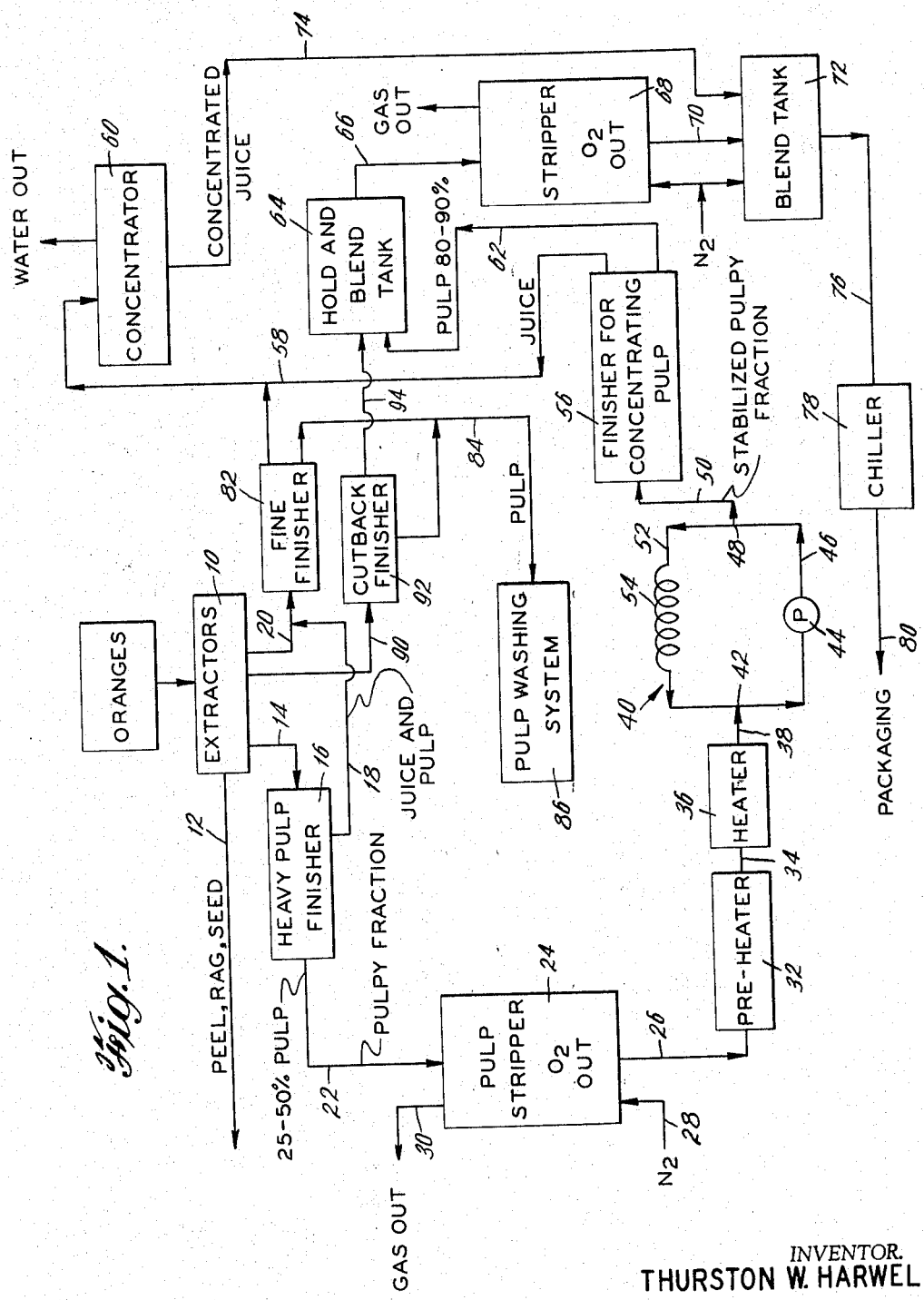
FIG. 1 is a schematic flow diagram of a preferred embodiment of the inventive process for producing flavor-stable concentrated juice.

In accordance with the present invention, there is provided a process for producing a stable juice pulp comprising separating the juice into a pulp fraction and a liquid fraction; subjecting the pulp fraction to a stripping operation wherein an inert gas is passed through the pulp fraction so as to preferentially displace the oxygen present in the pulp fraction; increasing the temperature of the pulp fraction to a temperature sufficiently high to effect the desired stability and maintaining the pulp fraction at that temperature until the desired stability is effected; and cooling the stabilized pulp fraction preferably below about 60° F. It is preferred to maintain the pulp fraction in an inert atmosphere throughout all process steps subsequent to the stripping operation. The effect of maintaining the pulp fraction in an inert atmosphere is to most efficiently avoid recontamination of the fraction with oxygen from the air, and other equivalent methods of avoiding recontamination with oxygen may be employed, although usually with somewhat less efficiency. There is also provided a juice pulp characterized by a pulp content of at least 15 weight per cent and an oxygen content of less than about one part per million, and a juice product containing at least one weight percent of such a pulp and further characterized by a light transmissivity of less than about 50 percent after storage for 24 hours at a temperature of 80° F. in a substantially inert atmosphere.

In order to eliminate or minimize the adverse organoleptic effects of heat on the pulp fraction of the juice due to the presence of oxygen, the inventive process removes oxygen from the pulp fraction by stripping it with an inert gas and then preferably continuously maintains the deoxygenated pulp fraction in an inert environment during the heat stabilization step and throughout all subsequent processing. The deoxygenated and heat stabilized pulp fraction may be packaged by itself for use in ades, blends, or other products or may be mixed with the liquid fraction of the juice. The pulp fraction may also be subjected to additional processing steps, such as heating or evaporation to remove water therefrom. Similarly, the liquid fraction of the juice may be subjected to additional processing steps, such as concentrating, stabilizing, or deoxygenation prior to being recombined with the pulp fraction, or the final recombined mixtures of the pulp and liquid fractions may be processed further, such as by deoxygenation or stabilizing.

The stabilizing temperature employed to achieve physical stability may be as high as the temperature of pasteurization for the particular juice pulp being treated, which is generally defined as a temperature high enough to destroy all pathogenic organisms and most other organisms in the vegetative form, i.e., high enough to effect partial sterilization. However, lower temperatures lead to better retention of the desirable flavor components. Of course, the process may be used to completely sterilize the pulp fraction, or even to completely destroy or inactivate the enzymatic substances in the pulp which cause deterioration during storage. Both pasteurizing and sterilizing temperatures for specific juices are well known to those skilled in the art. Although it is preferred to deoxygenate the pulp prior to the stabilizing step, it is within the scope of the invention to stabilize the juice prior to the deoxygenation.

Preferred embodiments of the inventive process as applied to orange juice will now be described in greater detail by referring to the drawings.

An embodiment of the inventive process for producing stable concentrated juice is shown in FIG. 1. Referring to FIG. 1, fresh oranges are delivered to conventional extractors 10 which remove the juice from the fruit. The peel, rag, and seeds are discharged as a byproduct of the extraction process through a line 12. The extracted juice and pulp is separated into three streams, and the first stream is passed through a line 14 into a heavy pulp finisher or separator 16 to screen the juice so as to separate it into a pulp fraction and a liquid fraction. A finisher is a juice-pulp separator which generally has a cylindrical screen surrounding a plurality of paddles or blades on a rotating axial shaft; the pulpy juice is fed into one end of the finisher, and the liquid fraction is expressed from the pulp through the cylindrical screen. The amount of pulp contained in the pulp and liquid fractions can be controlled by adjusting the size of the openings in the screen, the pressure exerted by the paddles against the screen, and the amount of restriction or pressure at the pulp discharge orifice. In some finishers, the separation is effected by gravity, and the blades simply act as agitators. Finishers are generally designated as "heavy pulp" finishers, "cutback" finishers, and "fine"

finishers. Although these designations are generally used, especially in the citrus juice industry, the designations are actually rather arbitrary, and there is no strict range of screen sizes for each type of finisher. A typical operation uses a 0.125" mesh screen in the heavy pulp finisher, a 0.040" mesh screen in the cutback finisher, and a 0.020" mesh screen in the fine finisher. Referring to FIG. 1 again, the heavy pulp finisher 16 should be adjusted to produce a pulp fraction containing pulp in an amount between about 15 and 100% by volume, preferably between 25 and 50% by volume. In any event, the pulp fraction must contain enough liquid, either water or juice, so that it can flow through the pipelines, stripping column, and other equipment used to carry out the process.

The liquid fraction from the finisher 16 is fed back through a line 18 into the second stream of juice from the extractors in line 20. The pulp fraction from the finisher 16 is passed through a line 22 into a countercurrent gas stripping column 24. The oxygen-containing pulp fraction is passed into the top of the stripping column 24 through the line 22, and the deoxygenated pulp fraction is removed from the bottom of the column 24 through a line 26. An inert stripping gas, such as nitrogen, is fed into the bottom of the column 24 through a line 28 and is introduced into the pulp fraction therein through a diffuser or one or more orifices. The stripping gas passes upwardly through the pulp fraction so as to preferentially displace the oxygen therefrom and is exhausted along with the removed oxygen from the top of the column 24 through a line 30. The stripping efficiency (oxygen removal per unit volume of gas consumption) of the stripping column 24 is proportional to the effective contact area of the gas-liquid or gas-pulp interface and the contact time. Accordingly, the amount of oxygen removed by the stripping operation can be controlled not only by varying the relative flow rates of the pulp fraction and the stripping gas, but also by controlling the bubble size of the stripping gas (decreasing the bubble size increases the surface area of the gas phase). To provide adequate protection for extended storage periods, it is generally preferable to reduce the oxygen content of the pulp fraction to a concentration of 0.1 to 1.0 part per million, but higher oxygen contents may be acceptable in many cases. A more detailed description and explanation of a stripping operation which can be used to strip the pulp fraction in the inventive process is given in "Investigations on the Use of Nitrogen for Stabilization of Perishable Food Products" in the April, 1950, issue of Food Technology. Alternatively, the stripping operation may be effected by means of a line sparger or a sparger in the bottom of a tank.

From the stripping column 24 the deoxygenated pulp fraction is passed through the line 26 into a preheater 32. This preheating step is usually employed in order to shorten the holding period required in the subsequent high-temperature stabilizing step. Any suitable heat exchanger may be used for the pre-heating operation. From the preheater 32, the warmed pulp fraction is passed through a line 34 into a heating means 36, which raises the temperature of the pulp fraction to a temperature sufficiently high to effect the desired stability, i.e., to a temperature between 100 and 300° F., preferably between 150 and 225° F. In the preferred heating means for the present process, the temperature of the pulp fraction is increased very rapidly by passing jets of steam through the pulp, thereby effecting a high heat energy transfer in a very short period. Clean, oxygen-free steam, i.e., steam free of compounds that will give off flavors in the final product, should be used in this step. Steam-injection heaters are well known in the food industry, and typical examples of steam injectors which are suitable for use in the present process are described in detail in U.S. Patents No. 2,625,488 and No. 2,636,430.

After the temperature of the pulp fraction has been increased to the required level in the heating means 36, the hot pulp fraction is passed into a holding tube 38, which is used to provide a holding period sufficient to properly stabilize the solution. Alternatively, the hot pulp fraction could be maintained at the desired temperature level by merely retaining it in the heating means 36 for the proper holding period. The holding period should be sufficient to achieve the desired physical stability, but insufficient to cause degradation of the pulp character as well as other objectionable thermochemical changes in the pulp. From the holding tube 38, the hot pulp fraction is passed into a cooler indicated generally as 40. In the preferred cooler shown schematically in the drawing, the hot pulp fraction is injected at junction 42 into a recirculating volume of a cooled pulp fraction which has been previously stabilized and substantially instantaneously cooled by a process which retains the volatile constituents thereof. The cooled pulp fraction should also be of the same composition as the hot pulp. By adjusting the relative volumes (flow rates) and temperatures of the hot pulp and cool pulp which merge at the junction 42, the recirculating volume of cool pulp can effect substantially instantaneous cooling of the hot pulp fraction to a temperature below that at which significant thermochemical change can be produced. From the junction 42, a pump 44 forces the cooled pulp fraction through a line 46 to a junction 48 where a portion of the pulp fraction is removed through a line 50. The remaining portion of the pulp fraction is recirculated through a line 52 and over a cooling coil 54, which continuously maintains the temperature of the recirculating pulp approaching the junction 42 at the desired level. Since the pulp cooled by the coil 54 is already at a temperature below that necessary for significant thermochemical change, this recirculation cooling does not result in any loss of flavorous constituents in the cooling body. The preferred recirculation cooler is described in more detail in copending U.S. patent application bearing Serial No. 33,480, filed June 2, 1960, now U.S. Patent No. 3,060,039 assigned to the assignee of the present application, and the description thereof is incorporated herein by reference.

From the junction 48 of the cooler 40, the cooled pulp fraction is passed through a line 50 into a finisher 56 where the pulp fraction is further concentrated by removing a major portion of the remaining fluid. The removed liquid is passed through a line 58 into the concentrator 60, which is described below. The concentrated pulp fraction is passed through a line 62 into a blend tank 64 where it is mixed with the low-pulp juice from the cutback finisher 92, also described below. From the blend tank 64, the recombined product is discharged through a line 66 into a second stripping column 68. If the pulp fraction is continuously maintained in a non-oxidizing atmosphere after it has been deoxygenated in the first stripping column 24, the liquid fraction or low-pulp juice may be deoxygenated prior to entering the blend tank 64, and it is not necessary to strip the recombined product. From the stripping column 68, the deoxygenated recombined product is passed through a line 70 into a blend tank 72, where it is mixed with concentrated juice from line 74. The blended product is discharged from the blend tank 72 through a line 76 into a chiller 78, and is then finally packaged, as at 80.

Referring back to the extractors 10, the second stream of freshly extracted juice and pulp in line 20, and the liquid fraction from finisher 16 mixed therewith, is passed into a fine finisher 82. The fine finisher 82 is adjusted not only to remove the large pulp particles, such as are removed by the heavy pulp finisher, but also controls the amount and size of the small particles of insoluble solids that remain suspended in the juice to provide "cloud" and low light transmission. The larger pulp particles removed by the heavy pulp finisher are commonly referred to as "floating pulp," and the distinction between fine finishers and heavy pulp finishers is well understood by those skilled in the art. As mentioned above, a typical fine finisher is equipped with 0.020-inch mesh screen. The liquid fraction from the fine finisher 82 is fed into the line 58 which passes it on into a concentrator 60 along with the liquid from finisher 56. The concentrator 60 may be a vacuum evaporating system, such as that described in U.S. Patent No. 2,911,308 to P. L. Smith, or a freeze concentration system, such as that described in U.S. Patent No. 2,967,778 to Cole et al. Concentrators are well known in the art and need not be described in detail herein. Concentrated juice is discharged from the concentrator 60 through line 74 and passed therethrough into the blend tank 72, as described above.

Again referring back to the extractors 10, a third stream of freshly extracted juice and pulp is discharged from extractors 10 through a line 90 and passed into a cutback finisher 92. As described above, the cutback finisher 92 removes smaller pulp particles than the heavy pulp finisher 16 but larger than the fine finisher 82. The liquid fraction from the cutback finisher 82 is fed through line 94 into the blend tank 64, as described above. The pulp fractions from both the fine finisher 82 and the cutback finisher 92 are passed through a line 84 into a pulp washing system 86 where the pulpy material is treated in the manner well known to those skilled in the art.

An embodiment of the inventive process for producing stable single-strength juice is shown in FIG. 2. All elements in FIG. 2 which correspond to elements in FIG. 1 have been assigned identical reference numbers. Referring to FIG. 2, the process illustrated therein is substantially the same as that shown in FIG. 1 except that neither the pulp fraction or the liquid fraction of the original juice is concentrated. Also, since no concentration is employed in this embodiment of the process, the cutback stream has been omitted, so that the fresh juice from the extractors is split into only two streams rather than three. As in the case of FIG. 1, a first stream of juice from the extractors 10 is passed through a line 14 into a heavy pulp finisher 16 which separates the juice into a heavy pulp fraction and a liquid fraction. The liquid fraction is discharged from the finisher 16 through a line 18 and fed into the second stream of juice in line 83. If desired, a portion of the juice and pulp from the finisher 16 may be passed through a line 19 into the fine finisher 82. The pulp fraction is discharged from the finisher 16 through a line 22 into a stripping column 24, where it is deoxygenated as described above in connection with FIG. 1. From the stripping column 24, the deoxygenated pulp fraction is stabilized by passing it through a line 26 into a preheater 32, then on through a line 34 into a heater 36, and finally discharged through a holding tube 38 into a recirculatory cooling system 40. A deoxygenated and stabilized pulp fraction is discharged from the cooling system through a line 50 and passed into a blend tank 64, where it is mixed with the single-strength finished juice from line 83. From the blend tank 64, the recombined product is discharged through a line 66 into a second stripping column 68. If the pulp fraction is continuously maintained in a nonoxidizing atmosphere after it has been deoxygenated in the first stripping column 24, the single-strength juice in line 83 may be deoxygenated prior to entering the blend tank 64. In such a case, it is not necessary to strip the recombined product. From the stripping column 68, the deoxygenated recombined product is passed through a line 70 into a chiller 78, and is then finally packaged, as at 80.

Referring back to the extractors 10 in FIG. 2, the second stream of freshly extracted juice and pulp in line 20 is passed into a fine finisher 82. The liquid fraction from the finisher 82 is passed through the line 83 into the blend tank 64, while the pulp fraction is passed through a line 84 into a conventional pulp washing system.

The processes described above in connection with FIGS. 1 and 2 include a step for recombining the deoxygenated and stabilized pulp fraction with a concentrated or single-strength liquid fraction of the juice. In many cases, it is desirable to package the pulp fraction separately rather than recombining the pulp immediately with a liquid fraction. For example, a deoxygenated and stabilized pulp fraction is useful in the preparation of ades, blends, and other beverages or food products. A preferred process for producing a stable juice pulp is illustrated in FIG. 3. Referring to FIG. 3, fresh juice from the extractors 10 is passed through a line 14 into a heavy pulp finisher 16 which separates the juice into a heavy pulp fraction and a liquid fraction. The liquid fraction is discharged from the finisher 16 through a line 18 and processed in any desired manner. The pulp fraction is discharged from the finisher 16 through a line 22 and passed into a conventional pulp washing system 86. Washed pulp from the system 86 is passed through a line 23 into a stripping column 24 where it is deoxygenated as described above in connection with FIG. 1. From the stripping column 24, the deoxygenated pulp fraction is stabilized by passing it through a line 26 into a preheater 32, then on through a line 34 into a heater 36, and finally through a holding tube 38 into a recirculatory cooling system 40. The deoxygenated and stabilized pulp fraction is discharged from the cooling system 40 through a line 50 into a finisher 56 where the pulp fraction is further concentrated by removing a major portion of the remaining liquid, which is removed through a line 57. The concentrated pulp fraction is passed through a line 62 and packaged as at 63. In order to prevent oxidation of the pulp in the finisher 56, the headspace therein is continuously blanketed by an inert gas, such as nitrogen, introduced through line 65 and removed through line 67.

To avoid contamination of the deoxygenated pulp fraction from oxygen in the atmosphere, all head spaces in the aforedescribed process systems are preferably purged with notrogen or other nonoxidizing gases. Of course, in a completely filled, air-tight system, there may be no head spaces, and no purging will be required. In other words, contamination of the pulp fraction with oxygen in the atmosphere may be avoided by inert gas blanketing, the walls of the equipment in a filled system, or any other suitable method. The final product should also be packaged or stored in an inert environment. Although the flow rate of the gas comprising the nonoxidizing atmosphere varies with the type of equipment employed, the flow rate should always be such as to maintain a pressure sufficient to insure that any leakage is outward.

While presently preferred embodiments of the present invention have been described hereinabove in some detail, it will be understood that the same are susceptible of numerous modifications and changes without departing from the scope of the invention. Thus, a single compartmented finisher may be used to perform the functions of several of the individual finishers shown in the drawings. Further, although the liquid fraction of the juice has been described above as passing directly from the concentrators or finishers to the blend tank, this liquid fraction may be subjected to additional processing steps. For example the liquid fraction could be stabilized in the same manner as the pulp fraction, so as to produce a completely deoxygenated and stabilized blended product. Similarly, the pulp fraction of the juice may be subjected to additional processing steps. For example, it may be desired to remove water from the pulp fraction by heating or evaporation. Also, the stripping operation which removes the oxygen from the pulp fraction can be employed at intermediate points in the process rather than as the initial step. However, since it is desirable to remove the oxygen from the pulp as soon as possible, it is preferable to employ the stripping step soon after the pulp fraction has been separated out of the whole juice. Finally, where the pulp and liquid fractions are recombined, the recombined product may be further processed. For example, the recombined product could be deoxygenated, as described above, or concentrated, or even completely dehydrated. These additional processing steps should be carried out in an inert atmosphere, especially in the case of complete dehydration.

In an example of the inventive process, freshly extracted orange juice was passed into a heavy pulp finisher equipped with a 0.125-inch mesh cylindrical screen to separate the juice into a heavy pulp fraction and a liquid fraction. The finsher was adjusted in the conventional manner to produce a pulp fraction containing about 50% by weight pulp and a liquid fraction containing about 15% by weight pulp. Pulp contents were determined by the conventional vibrating screen test, vibrating a 24-ounce sample on a 20-mesh screen for one minute. From the finisher, the pulp fraction of the juice was passed into a stripping column and passed downwardly therethrough at a temperature of about 75° F. and a flow rate of about 30 gallons per hour. The stripping column was 6 feet high and 4 inches in diameter. Nitrogen was passed into the bottom of the stripping column at a rate of 10 cubic feet per hour and introduced into the pulp fraction therein through a 2-inch diameter porous disc having 10-micron openings. The oxygen content of the pulp fraction was checked at various points by removing the gases from a sample of the pulp by evacuation and then analyzing the removed gases for oxygen content by a modified Orsot analysis and by use of dissolved oxygen polarographic equipment. The oxygen content of the pulp fraction was found to be 0.60 milliliter/100 grams before stripping and 0.01 milliliter/100 grams after stripping. The deoxygenated pulp fraction was withdrawn from the bottom of the stripping column and passed through a pre-heater (coil immersed in hot water) which increased the temperature of the pulp fraction to about 125° F. The pre-heated pulp fraction was then passed into a heater where it was quickly heated to a stabilizing temperature of about 225° F. and maintained at that temperature for fifteen seconds. From the heater, the hot pulp was passed on through a cooler (coil immersed in cold water) which reduced the temperature of the pulp fraction to about 50° F. The deoxygenated and stabilized pulp fraction was then passed into a finisher, which removed enough liquid therefrom to increase the pulp content to about 75% by weight. The concentrated pulp was then blended with the original liquid fraction and additional single-strength juice and packed under nonoxidizing conditions in 6-ounce cans. These cans were stored at 0° F. and periodically subjected to taste tests along with a similar product prepared from pulp which had been heat stabilized but not deoxygenated or processed under nonoxidizing conditions. The results of the comparative taste tests on these two products are shown in the following table.

prepared from the deoxygenated pulp remained substantially constant while the flavor score of the product prepared from nondeoxygenated pulp decreased rather rapidly. The light transmissivity of each of the samples listed in the table was measured after storage for 24 hours at a temperature of 80° F. in a substantially inert atmosphere.

While various specific embodiments have been illustrated and described herein, it is not intended to limit the present invention to any of the details herein shown.

What is claimed is:

1. A process for producing a stable juice pulp comprising:
   (a) separating the juice into a pulp fraction and a liquid fraction;
   (b) subjecting said pulp fraction to a stripping operation wherein an inert gas is passed through said pulp fraction so as to preferentially displace the oxygen present in said pulp fraction;
   (c) increasing the temperature of said pulp fraction to a temperature sufficiently high to effect the desired stability and maintaining said pulp fraction at that temperature until the desired stability is effected; and
   (d) cooling the stabilized pulp fraction.

2. The process of claim 1 wherein said pulp fraction is maintained in an inert environment throughout all process steps subsequent to said stripping operation.

3. The process of claim 1 wherein said stabilized pulp fraction is combined with single-strength juice.

4. The process of claim 1 wherein said stabilized pulp fraction is combined with concentrated juice.

5. The process of claim 3 wherein the combined product is subjected to a stripping operation wherein an inert gas is passed through said product so as to preferentially displace the oxygen present in said product.

6. The process of claim 4 wherein the combined product is subjected to a stripping operation wherein an inert gas is passed through said product so as to preferentially displace the oxygen present in said product.

7. A process for producing a stable juice pulp comprising:
   (a) separating the juice into a pulp fraction and a liquid fraction;
   (b) subjecting said pulp fraction to a stripping operation wherein an inert gas is passed through said pulp fraction so as to preferentially displace the oxygen present in said pulp fraction;
   (c) increasing the temperature of said pulp fraction to at least the temperature of pasteurization therefor and maintaining said pulp fraction at said temperature until the desired stability is achieved; and

TABLE

| Product | Gel Value | Percent Light Trans-missivity | Floating pulp, gm./6-oz. can | Taste Tests After Storage | | | | | | | |
|---|---|---|---|---|---|---|---|---|---|---|---|
| | | | | 30 Days at 0° F. | | 60 Days at 0° F. | | 90 Days at 0° F. | | 6 Months at 0° F. | |
| | | | | Flavor Score | Percent Pref. | Flavor Score | Percent Pref. | Flavor Score | Percent Pref. | Flavor Score | Percent Pref. |
| N₂ Processed Heat Stabilized and N₂ stripped pulp added | 0 | 15 | 9.1 | 72 | 33 | 73 | 47 | 70 | 60 | 69 | 100 |
| Air processed Heat stabilized pulp added | 0 | 12 | 11.6 | 74 | 67 | 73 | 53 | 62 | 30 | 42 | 0 |

The percent preferring does not total 100% in every case because some members of the taste panel show no preference between certain samples. It is clear from the above table that the preference for the product prepared from the deoxygenated pulp increased radically as the storage period increased. Also, the flavor score of the product (d) substantially instantaneously cooling the stabilized pulp fraction.

8. The process of claim 7 wherein said pulp fraction is maintained in an inert environment throughout all process steps subsequent to said stripping operation.

9. A process for producing a stable juice product comprising:
- (a) separating the juice into a pulp fraction and a liquid fraction;
- (b) subjecting said pulp fraction to a stripping operation wherein an inert gas is passed through said pulp fraction so as to preferentially displace the oxygen present in said pulp fraction;
- (c) increasing the temperature of said pulp fraction to a temperature sufficiently high to effect the desired stability and maintaining said pulp fraction at that temperature until the desired stability is effected;
- (d) cooling the stabilized pulp fraction; and
- (e) recombining the cooled pulp fraction with said liquid fraction.

10. The process of claim 9 wherein said pulp fraction and the recombined product are maintained in an inert environment throughout all process steps subsequent to said stripping operation and said liquid fraction is maintained in an inert atmosphere throughout all process steps subsequent to said separating step.

11. A process for producing a stable juice concentrate comprising:
- (a) separating the juice into a pulp fraction and a liquid fraction;
- (b) subjecting said pulp fraction to a stripping operation wherein an inert gas is passed through said pulp fraction so as to preferentially displace the oxygen present in said pulp fraction;
- (c) increasing the temperature of said pulp fraction to a temperature sufficiently high to effect the desired stability and maintaining said pulp fraction at that temperature until the desired stability is effected;
- (d) cooling the stabilized pulp fraction;
- (e) concentrating said liquid fraction by removing water therefrom; and
- (f) mixing the cooled pulp fraction with the concentrated liquid fraction.

12. The process of claim 11 wherein the blended product formed by mixing said cooled pulp fraction with said concentrated liquid fraction is subjected to a stripping operation wherein an inert gas is passed through said blended product so as to preferentially displace the oxygen present in said product.

13. A process for producing stable orange juice pulp comprising:
- (a) separating orange juice into a liquid fraction and a pulp fraction containing at least 15% by volume pulp;
- (b) subjecting said pulp fraction to a stripping operation wherein an inert gas is passed through said pulp fraction so as to reduce the oxygen content thereof to at least 1.0 part per million;
- (c) increasing the temperature of said pulp fraction to between 100 and 300° F. and maintaining said pulp fraction at said temperature until the desired stability is achieved; and
- (d) cooling the stabilized pulp fraction to a temperature below about 60° F.

14. A process for producing a stable juice pulp comprising:
- (a) separating the juice into a pulp fraction and a liquid fraction;
- (b) subjecting said pulp fraction to a stripping operation wherein an inert gas is passed through said pulp fraction so as to preferentially displace the oxygen present in said pulp fraction;
- (c) increasing the temperature of said pulp fraction to a temperature sufficiently high to effect the desired stability and maintaining said pulp fraction at that temperature until the desired stability is effected;
- (d) cooling the stabilized pulp fraction; and
- (e) concentrating said stabilized pulp fraction by removing water therefrom.

15. The process of claim 14 wherein water is removed from said stabilized pulp fraction by evaporating water from said pulp fraction while subjecting said fraction to a pressure less than atmospheric.

16. A process for preparing a stable juice product comprising:
- (a) separating the juice into a pulp fraction and a liquid fraction;
- (b) subjecting said pulp fraction to a stripping operation wherein an inert gas is passed through said pulp fraction so as to preferentially displace the oxygen present in said pulp fraction;
- (c) increasing the temperature of said pulp fraction to a temperature sufficiently high to effect the desired stability and maintaining said pulp fraction at that temperature until the desired stability is effected;
- (d) cooling the stabilized pulp fraction;
- (e) subjecting said liquid fraction to a stripping operation wherein an inert gas is passed through said pulp fraction so as to preferentially displace the oxygen present in said liquid fraction;
- (f) increasing the temperature of said liquid fraction to a temperature sufficiently high to effect the desired stability and maintaining said liquid fraction at that temperature until the desired stability is effected;
- (g) cooling the stabilized liquid fraction;
- (h) and recombining said stabilized pulp fraction with said stabilized liquid fraction.

References Cited by the Examiner

UNITED STATES PATENTS

| | | | |
|---|---|---|---|
| 981,405 | 1/1911 | Fernbach | 99—205 |
| 2,301,901 | 11/1942 | McKinnis | 99—205 |
| 2,453,109 | 11/1948 | Mac Dowell | 99—205 X |
| 2,724,652 | 11/1955 | Brent | 99—205 |
| 2,911,308 | 11/1959 | Smith et al. | 99—205 X |

OTHER REFERENCES

Food Technology, volume 4, 1950, article entitled "Investigations on the Use of Nitrogen for the Stabilization of Perishable Food Products," by A. L. Bayes, pages 151–157.

A. LOUIS MONACELL, *Primary Examiner.*

ABRAHAM H. WINKELSTEIN, *Examiner.*

G. N. MANN, R. AULL, H. LORD,
*Assistant Examiners.*